July 6, 1926.

J. REECE 1,591,054

CLUTCH

Filed June 30, 1921

Inventor:
John Reece,
by Rogers, Kennedy & Campbell,
his Attys.

Patented July 6, 1926.

1,591,054

UNITED STATES PATENT OFFICE.

JOHN REECE, OF BOSTON, MASSACHUSETTS, ASSIGNOR TO REECE TRANSMISSION COMPANY, OF BOSTON, MASSACHUSETTS, A CORPORATION OF MAINE.

CLUTCH.

Application filed June 30, 1921. Serial No. 481,635.

This invention is a novel clutch, that is to say, a device which is engageable and disengageable for the purpose of effectively but shocklessly clutching or coupling together two shafts, and unclutching them. The herein illustrated clutch is designed more especially for the driving gear of motor vehicles but could be used for different purposes. In a motor vehicle the engine drives first a shaft which may be termed the engine or power shaft. A second shaft, in alinement with the first, is adapted to be clutched to or unclutched from the power shaft, the present clutch being designed for this purpose. For convenience this second shaft may be termed the clutch shaft. Between the clutch shaft and the driving wheels is usually a speed change mechanism by which the ratio between the speeds of the clutch shaft and the final or driven shaft may be varied.

The general object of the present invention is to afford a clutch of great efficiency, low weight, and high durability, but the herein disclosed embodiment of the present invention affords further particular advantages, which will be hereinafter more particularly pointed out.

To the accomplishment of the above mentioned objects and advantages, the present invention consists in the novel clutch and the novel method or mode of operation involved, as well as the novel features of mechanism, combination, arrangement and detail herein described or illustrated. I will describe one or more forms or embodiments in which the principles of the invention may be carried out, but it is to be understood that this is merely illustrative, and the true scope of the invention will be pointed out in the claims.

In the accompanying drawings Figure 1 shows what may be termed a rear elevation of a mechanism embodying the present invention, the same shown partly in section taken on the line 1—1 of Fig. 2.

Figure 1:
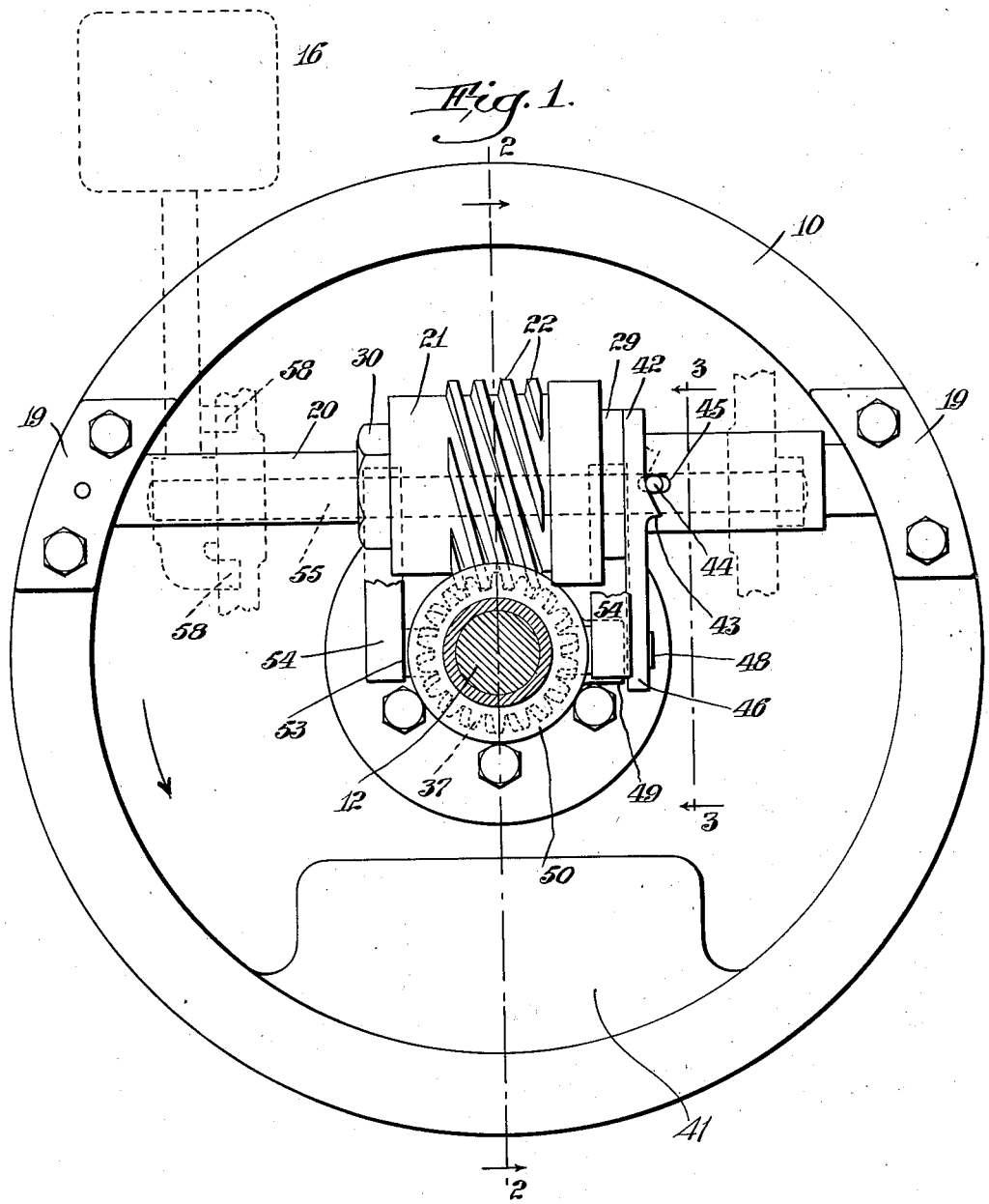
Figure 2:
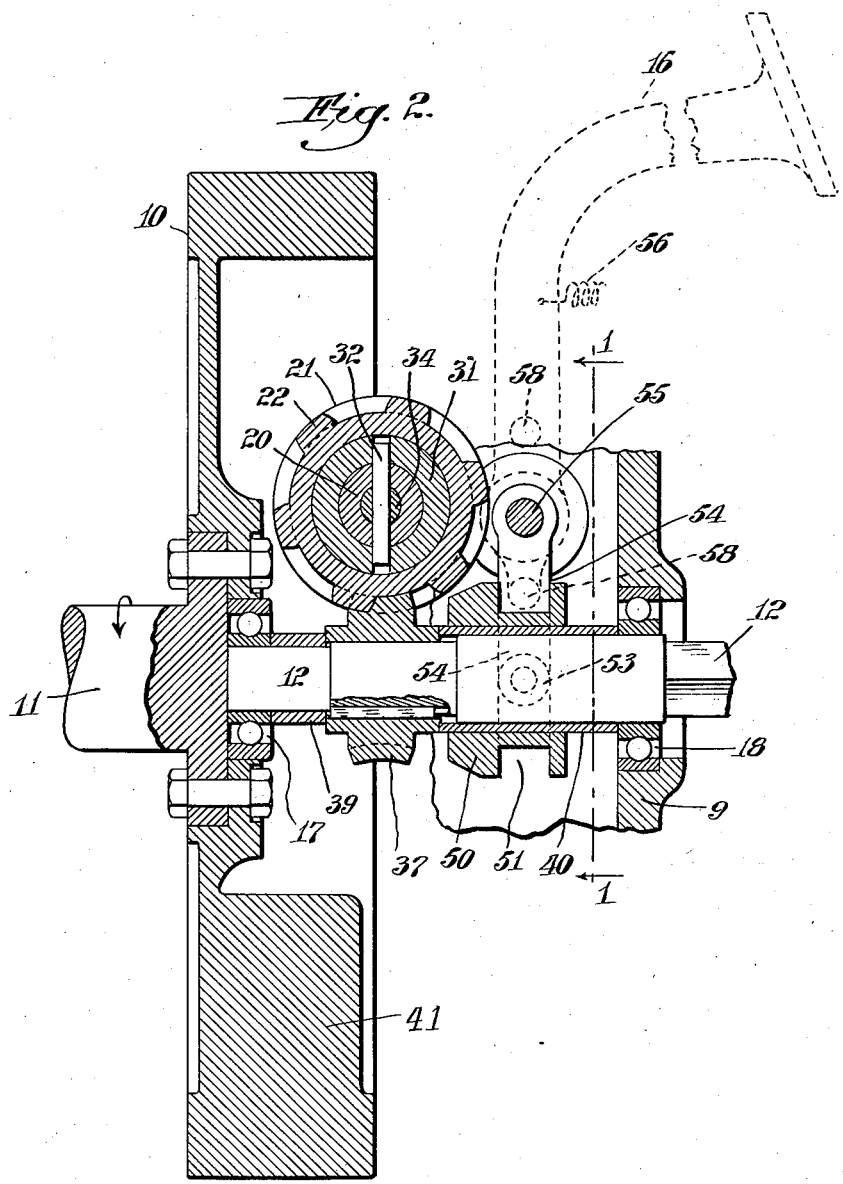
Figure 2 is a central longitudinal section on the line 2—2 of Fig. 1.
Figure 3:
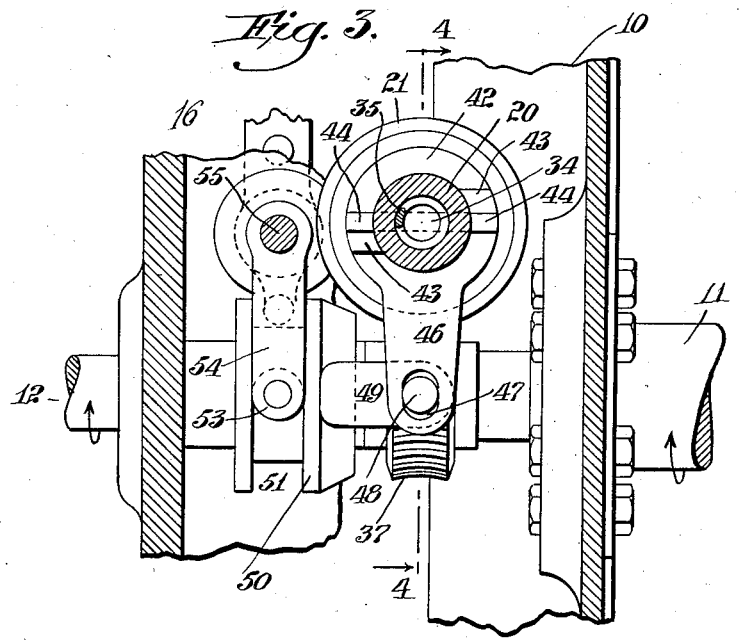
Figure 3 is a side elevation partly in section on the line 3—3 of Fig. 1.

In a specific sense the principle of the present invention consists in employing as a clutch means between the power shaft and clutch shaft the device known in mechanics as a worm gearing or worm and wheel. This, however, is not used in its customary or intended manner, namely, to transmit rotation with great reduction of speed and increase of power, but is herein employed in a novel manner by which the shafts may be clutched together to give unit ratio, or effectively unclutched to terminate the transmission of power; all preferably without disengaging or unmeshing the worm and wheel. The device may also be used to admit of slip or lost motion when desired, so as to maintain the clutch shaft in rotation at a less speed than the power shaft.

In referring to the worm wheel, which is but one form of the so-called spiral or helical gear, I intend to include any other spiral or helical gearing constructed and combined in a manner to give the operation and the advantages of the herein described embodiment. Spiral gears are constructed with teeth or threads helically arranged upon the respective shafts, which are neither parallel nor in the same plane, but usually at right angles to each other and spaced substantially apart. I prefer the worm and wheel gearing wherein one of the members takes the form of a screw or worm while the other takes the form of a gear having teeth inclined at the same angle as the threads of the worm. In such device the worm usually drives the wheel, with reduction of speed and increase of power, and a locking or self-locking function is afforded by reason of which the wheel is unble to drive the worm when the helix angle, that is the incline of the thread or tooth, is sufficiently small, considering the friction of the metal and the existing drag or resistance to rotation of the worm.

By the principles of the present invention, one of the helical gears is mounted directly on the second or clutch shaft, while the other, constantly in mesh therewith, is mounted or journaled on the head or fly-wheel of the power shaft so as to rotate on an eccentric axis and with very light resistance to rotation, the result being that the last mentioned gear or worm may rotate or spin freely by reason of the rotation of the power shaft, while the second or clutch shaft is stationary; while on the other hand the application of resistance tending to prevent rotation of the worm utilizes the self-locking characteristic to prevent any motion or rotation as between the two gears, thus locking them and the two shafts as a unitary whole, and giving full speed or direct drive. When full speed is being transmitted there is no movement between the gears; when no power is being transmitted the worm wheel is driving the worm, which is free running for this purpose; thus the present use of this type of gearing is wholly contrary to its ordinary and known utility.

The total weight of the present clutch device may be extremely light. For example, where the prevailing friction disk clutch, used in automobiles, may weigh thirty pounds or more, the present clutch may have a weight of only five pounds or less. The action of the previous clutch is wholly by friction, which results in substantial wear and deterioration, whereas the present clutch is indefinitely durable due to the substitution, in lieu of friction, of the self-locking action of the worm and wheel, which assumes by far the greater portion of the gripping or clutch function. The only friction, or drag, or resistance required to be applied in the present invention is the negligible amount necessary to retard the worm, which is designed to be normally free running, to bring into play the self-locking characteristic of this mechanical device.

The present clutch can be put into action more efficiently and quickly and yet with all desirable smoothness of action in the operation of starting up the vehicle or shifting the gears from a lower to a higher speed; it being merely necessary to apply gradually the resistance or retardation to the rotation of the worm to bring it into locking relation to the worm wheel; and the slow and difficult manipulation of the known disk clutch being eliminated.

Further, it is well known that it is difficult with the ordinary types of transmission mechanism to effect a shifting from a higher to a lower speed ratio except when the vehicle is moving with extreme slowness. In one well known make of automobile a pawl and ratchet have been provided in one part of the train of mechanism to enable such a result, but the present clutch dispenses with any such expedient. In making the change to a lower ratio herein the pedal may be pressed to free the worm and disengage the clutch; the gears then shifted to the desired ratio, which causes the clutch shaft to speed up; the clutch being later closed when the engine has speeded up, or when the load has retarded the driven shafts, or both, and the engine and clutch shafts are substantially in unison. The change is easily and smoothly made even with the vehicle travelling at high speeds.

A further advantage is the extreme ease of disengaging the clutch, and the ability to hold it open with slight effort so that the drive may be discontinued indefinitely and without inconvenience, or wear and tear. This is due to the fact that the only action required to render the drive ineffective is to remove the very slight drag or resistance which is necessary to put the worm into locking relation to the wheel. The resistance or effort might be as low as one-twentieth of the frictional resistance involved in the friction disk clutch. Therefore, but a very light spring is necessary to bring the parts into clutching relation and the operator has merely the work of overcoming this light spring and holding it restrained. With the previous clutch it has sometimes been found difficult to disengage, especially by persons not of vigorous build, owing to the strength of the spring used to put the clutch into operation. With the present invention a small light pedal can be used similar to the pedal frequently used to operate the accelerator of an automobile.

The present clutch further possesses the capability, to a high degree, of permitting slippage or loss of drive to a controllable extent by an adjustment of the clutch to a condition between that of full drive and no drive; this being of considerable importance in making an up grade or in heavy traffic. It is herein secured by a very slight amount of adjusting of the clutch and without any resulting injurious heat or wear. The locking function of the worm and wheel gives nearly the entire amount of grip necessary, and but a very easily effected adjustment is required to alternately grip and release the clutch.

Unlike the friction disk clutch, the present invention is operative in oil. While oil may destroy the clutching action of the older clutch, the present mechanism will work to better advantage when the casing is filled with oil. Therefore, the clutch casing and the crank casing may be combined into one oil-filled compartment, with the resultant greater durability of all the movable parts of the mechanism.

Describing the specifically illustrated mechanism, a fly-wheel 10 is indicated mounted on an engine or power shaft 11, as usual in automobiles. The fly-wheel serves as a head or enlargement for supporting a part of the clutch mechanism to be described. The second or clutch shaft 12 is in line with the power shaft and is formed with certain shoulders, which need not be specifically mentioned. A ball bearing 17 is shown between the forward extremity of the clutch shaft 12 and the rear extremity of the power shaft 11; and a similar bearing 18 is shown between the clutch shaft and a stationary frame part 9.

Coming now to the worm and wheel constituting the clutch, the former, carried eccentrically on the power shaft, will first be described. Held down by clamps or caps 19 is an axle 20 extending eccentrically across the head or fly-wheel 10 of the power shaft. The worm 21 is mounted on this axle in a position to engage the worm wheel 37, to be described. The axle 20 may be stationary, as shown, the worm turning loosely upon it, and may be hollow for accommodating parts of the mechanism for applying drag or resistance to the rotation of the worm to bring its clutching properties into effect.

The worm 21 is shown as a hollow cylindrical member having helical teeth or threads 22. Six worm threads are shown, so that with eighteen teeth on the worm wheel the ratio will be three rotations of the worm for one of the wheel, but the ratio and numbers of teeth may be varied at will. The threads 22 of the worm are shown as arranged at a helix angle of approximately 15°. To secure the best results, including the locking action of the worm and wheel, the angle should not be more than a few degrees more or less than 15°.

The worm should be very freely rotatable and is preferably loose on the axle 20, upon which it is shown mounted by two ball bearings of different sizes, the smaller bearing 23 at the left consisting of an outer race 24 secured to the worm and an inner race 25 mounted directly on the axle; while the larger bearing 26 at the right consists similarly of inner and outer races 27 and 28. The difference in the size of the two bearings facilitates the assemblage of the illustrated elements. Each bearing is shown as of the combined radial and thrust type, so that frictionless rotation is afforded and the worm held against axial movement. Surrounding the axle 20 is shown a ring 29 bearing against a shoulder on the axle, and the inner race of the bearing 26 contacts against this ring; while the bearing at the opposite end is confined by a nut 30 screw threaded upon the axle to clamp the inner race against another shoulder formed on the axle.

As a means for producing a drag or resistance to the worm so as to retard or prevent its rotation and partially or wholly put into effect the self-locking action of the worm wheel, many sorts of expedients can be employed. In one form devised by me, the worm wheel is arranged to drive the worm both directly and through a lateral train of gearing, which latter, by controlled readjustment, can be made to relatively retard the worm so as to give the self-locking action. A simpler method, however, and one which is better for certain purposes, is that herein shown in the drawings, in which a simple clutch or brake is employed, arranged to impose friction to retard the rotation of the worm. Normally, the worm rotates freely by reason of its ball bearings and it spins rapidly when actuated by the worm wheel. When substantial drag is applied, the worm resists this action and the wheel is unable to drive it, so that the two become effectively interlocked and the shafts clutched together.

One mode of embodying this latter plan is to provide a wedge or cone 31 within the worm 21, and provide for axial shifting of the wedge to apply friction to the worm. The wedge is hollow, surrounding the axle 20 and its angle of engagement is shown as about 15°, the inner surface of the worm being correspondingly formed. A pin 32 extends through the wedge or cone from one side to the other, passing through the hollow interior of the axle 20 and through the slots 33 in the walls thereof. These slots permit sufficient play of the pin to give the necessary gripping and releasing action of the wedge. These adjustments may be effected by an interior rod 34, also engaged by the pin 32. A spring 35 is employed, tending constantly to press the wedge into frictional engagement with the worm. This spring is shown as bearing against the extremity of the rod 34, and it may be held under compression by a pin and disk abutment 36. The spring may be set to a pressure of about eighty pounds, which will give very effective retarding action upon the worm wheel, and be very easily retractible for releasing the clutch. The manner of retraction will be later described.

The worm wheel 37 is shown keyed directly upon the second or clutch shaft 12, its teeth 38 engaging the threads of the worm. The axial position of the wheel upon the shaft is shown as maintained by spacing sleeves 39 and 40 to the front and rear of the wheel. The wheel has already been described as comprising teeth 38 arranged at an angle of 15°, the teeth being eighteen in number and constantly in mesh with the worm. The full driving action of the worm wheel upon the worm takes place when the wheel is actually stationary but relatively rotating. That is to say, when the rotation of the fly-wheel carries the worm around the clutch shaft, while the shaft and wheel are stationary, the teeth of the wheel engaging the threads of the worm cause the rotation of the worm upon its own axis at three times the rotary speed—in this case— of the power shaft. The relative rotation and action of the worm wheel is the effect of the difference in speed between the power shaft and the clutch shaft. When driving action of the wheel upon the worm is prevented, this negatives any difference of rotation, and the clutch shaft necessarily assumes the speed of the power shaft.

Figure 4:
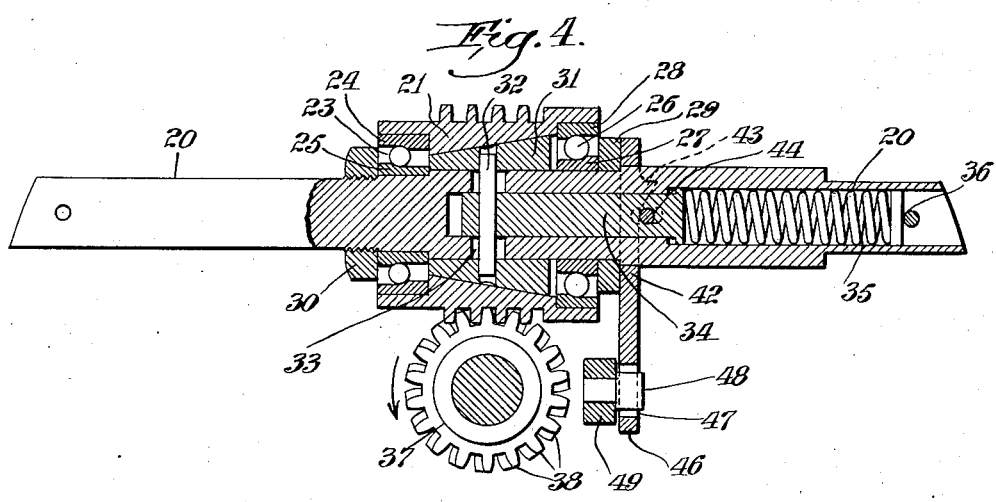
Figure 4 is a vertical section on the line 4—4 of Figure 3.

The control of the clutch from the pedal 16 may be as follows. A cam member or disk 42 surrounds the axle 20 adjacent to the ring or collar 29, and possesses a pair of cams 43 adapted to bear against opposite cam pins 44 projecting from the spring operated rod 34 through slots 45 in the walls of the axle. The arrangement is such that the turning of the cam or disk acts upon both pins to move the rod to the right in Fig. 4, thus compressing the spring 35 and withdrawing the braking cone 31 from its frictional engagement with the worm 21. To effect this rotation of the cam, it is provided with an arm or extension 46, the extremity of which is slotted at 47 and engaged by a pin 48 mounted on a projection 49 of a member 50, preferably in the form of a grooved ring slidable axially upon the sleeve 40 surrounding the clutch shaft 12. The groove 51 of the sliding member 50 is engaged by the opposite pins 53 of a yoke or two-armed device 54, the axle 55 of which extends laterally and carries the pedal 16. A spring 56 constantly pulls on the pedal so as normally to maintain the parts in the position shown, the cams 43 not having acted upon the pins 44, and the cone or wedge 31 effecting a drag upon the worm 21 so that the worm and wheel are normally in locked condition, and the power and clutch shafts rotate at the same speed. The pedal 16 may have the usual stops 58 limiting its forward and return movements.

It is believed that the operation of the present invention will be sufficiently clear from the hereinabove statements of function, advantage and construction. When the foot is off the pedal, the spring thereof holds the parts in such position that the light cone or wedge clutch is in force to prevent rotation of the worm, thereby causing interlocking of the worm and wheel, and transmission of power from one shaft to the other at unit ratio. The throwing forward of the pedal to its full extent opens the worm brake or clutch so as to release the worm, which can therefore be freely rotated by the worm wheel so that the worm and the fly-wheel carrying it may turn at full speed without any power transmission to the clutch shaft carrying the worm wheel. Intermediate pedal positions can be found which will admit slight slippage when it is desired to relax the speed of transmission without any change of the drive or ratio.

The frame part 9 may be extended outwardly and forwardly in the form of a casing which can be filled with a light oil, and indeed this casing could be continued forward and made a part of the crank casing.

Various other modifications and developments can be introduced. For example, instead of a single worm carried on the flywheel engaging the worm wheel, the worm could be duplicated by a similar one at the opposite side of the worm wheel, if it were desired to secure the additional effect thereof. The controller or pedal 16 could be so connected that pressing it will apply resistance to the worm instead of removing it, the spring 35 and cams 43 being reversed in action. The shaft carrying the worm wheel might be used as a driving or power shaft in some cases, the other, carrying the worm, used as a clutch or second shaft, the gripping and releasing of the worm acting to clutch or unclutch the shafts, as described. In using the term "shaft clutch" in the claims, I refer to a clutch for any kinds of shafts, or other rotary members. The flywheel may be designed with a counterweight 41 to offset the weight of the worm and fittings.

I have thus described a shaft clutch embodying the principles and attaining the objects and advantages of the present invention, and further advantages will be apparent to those skilled in the art. Since many matters of arrangement, combination, operation, structure and detail may be variously modified, without departing from the principles involved, I do not intend to limit the invention to such matters except to the extent specifically recited in the respective appended claims.

What I claim is:—

1. A shaft clutch comprising in combination with the power shaft, and the clutch shaft in alinement therewith, a rotatable worm carried by the power shaft, adapted to rotate freely about an axis spaced from and at an angle to the shaft axis, a worm wheel carried by the clutch shaft, in constant engagement with said worm, the two designed with such helix angles as to afford a self locking action preventing the wheel driving the worm, and means for applying and removing resistance to the rotation of the worm, comprising a retarder carried by the power shaft and arranged to improse friction upon the worm, with a spring arranged to maintain the retarder in braking position, and connections for at will adjusting the brake from such position, whereby the shafts may be clutched or unclutched.

2. A shaft clutch comprising in combination with the power shaft, and the clutch shaft in alinement therewith, a rotatable worm carried by the power shaft, adapted to rotate freely about an axis spaced from and at an angle to the shaft axis, a worm wheel carried by the clutch shaft, in constant engagement with said worm, the two designed with such helix angles as to afford a self locking action preventing the wheel driving the worm, and means for applying and removing resistance to the rotation of the worm, comprising a friction brake carried by the power shaft, a brake adjusting device, an arm extending from said device toward the shaft axis, an axially movable member engaging said arm to shift it, and exterior means for shifting said member.

In testimony whereof, I have affixed my signature hereto.

JOHN REECE.